United States Patent [19]

Toung

[11] Patent Number: 4,493,649

[45] Date of Patent: Jan. 15, 1985

[54] COLLAPSIBLE GLOBE ASSEMBLY

[76] Inventor: Wen H. Toung, No. 106, Teh-An St., Chu-Tong Cheng, Hsin-Chu, Taiwan

[21] Appl. No.: 464,665

[22] Filed: Feb. 7, 1983

[51] Int. Cl.³ .............................................. G09B 27/08
[52] U.S. Cl. .................................. 434/138; 434/133; 434/136
[58] Field of Search ............... 434/138, 131, 133, 136, 434/137, 143

[56] References Cited

U.S. PATENT DOCUMENTS

| 952,119 | 3/1910 | Van Keuren | 434/138 |
| 1,132,409 | 3/1915 | Utsunomiya | 434/138 |
| 1,196,108 | 8/1916 | Harbeck | 434/133 |
| 2,492,785 | 12/1949 | Concordet | 434/143 |

FOREIGN PATENT DOCUMENTS

| 882321 | 7/1953 | Fed. Rep. of Germany | 434/131 |
| Ad.10681 | of 1899 | United Kingdom | 434/133 |

*Primary Examiner*—William H. Grieb

[57] ABSTRACT

A globe of inflated envelope is supported by a bowed arm formed of releasably connectible curved segments and detachably mounted on a stand. The bowed arm further carries a casing containing a driving mechanism for rotating the globe and producing a musical sound during rotation of the globe.

4 Claims, 3 Drawing Figures

U.S. Patent   Jan. 15, 1985   4,493,649
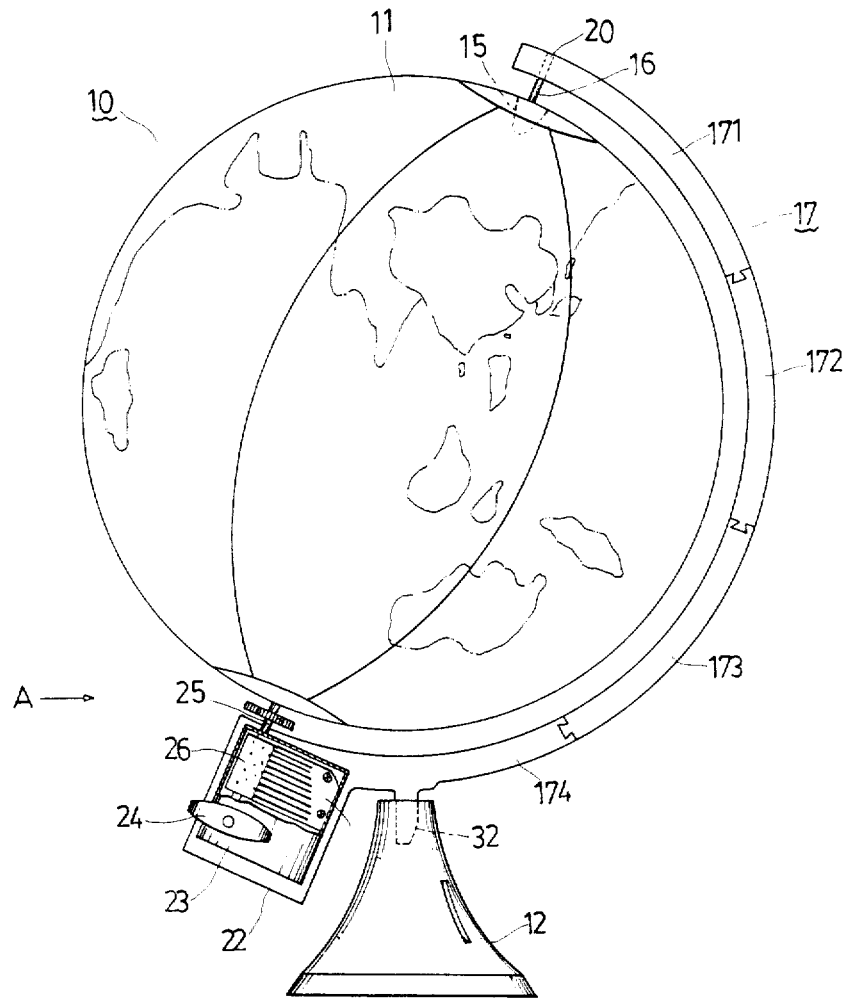
FIG. 1
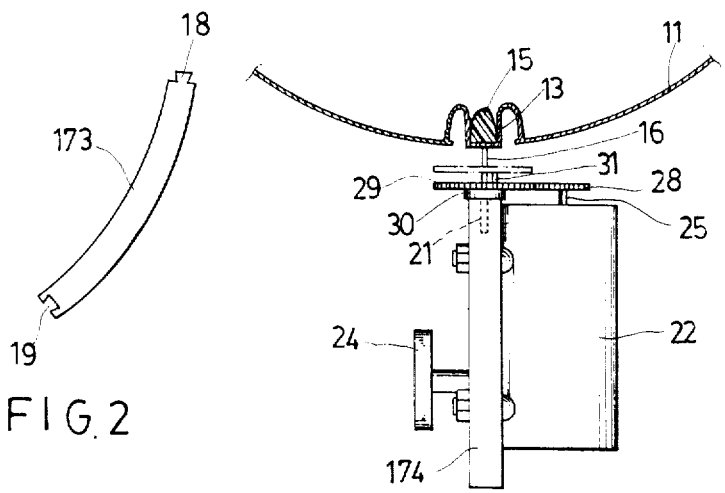
FIG. 2
FIG. 3

COLLAPSIBLE GLOBE ASSEMBLY

BACKGROUND OF THE INVENTION

This invention relates to a geographical globe commonly used for educational purpose, particularly to one that is collapsible for easy stowage.

It is well known that geographical globes are constructed in a collapsible form so as to improve the conventional globes of rigid, heavy and bulk bodies. One of the improvements is disclosed in U.S. Pat. No. 952,119 in which an inflatable globe is rotatably mounted on a bowed arm which is pivoted to a stand so that the globe as well as the bowed arm can be folded in a compact manner.

SUMMARY OF THE INVENTION

A general object of the invention is to provide an improved collapsible globe with a bowed arm which can be disassembled into parts so that the whole assembly can be kept in a more compact manner.

Another object of the invention is to provide an improved collapsible globe rotatable by electrically or mechanically operated driving means.

Further object of the invention is to provide an improved collapsible globe equipped with a musical apparatus to provide an amusing sound during rotation.

According to the invention, a globe assembly is comprised of, a globe-shaped envelope of flexible material having two inflating passages on the wall thereof in diametrically opposite positions, two plug members for obstructing the passages, a bowed support arm formed of releasably connectible curved segments, two pin members fixedly received in the plug members and passing through two ends of the bowed support arm, a driving mechanism provided at one end of the arm for rotating one of the pin members, and a stand for supporting the bowed support arm.

Advantageously, the curved segments are interconnected by interengagements of protrusions and recesses. The driving mechanism may includes an output shaft drivingly connected to the pin member by a pair of interengaging gear members. There may also be provided means for retaining the gear members in a separate position so that the globe shaped envelope can be rotated by hand.

According to an aspect of the invention, the globe is provided with a driving mechanism including a mainspring. Advantageously the driving mechanism can be corporated with a mechanical musical apparatus.

The manner in which the above and related objects is accomplished together with the attending advantages and features of the invention will appear more fully from the following detailed description and drawings.

BRIEF DESCRIPTION OF THE DRAWINGS

FIG. 1 is an elevational view of a globe constructed according to the invention;

FIG. 2 is a view illustrating a curved segment of the bowed arm; and

FIG. 3 is a portion of the globe assembly viewed in the direction along the arrow A of FIG. 1.

DETAILED DESCRIPTION OF THE PREFERRED EMBODIMENT

Referring to FIGS. 1, 2 and 3, there is shown a geographical globe assembly 10 which includes a globe 11 made of a gas impervious flexible sheeting material mounted on a stand 12. The globe 11 is provided with two diametrically opposite inflating passages 13 which can be accomplished by a known manner, such as, by heat-sealing or adhesively bonding semi-rigid molded tube like members, as better shown in FIG. 3, to the wall of the globe 11. Two plug member 15 each of which is fixedly receiving a pin member 16 are further provided for obstructing the inflating passages 13.

As embodied herein, there is further provided a bowed support arm 17 which is formed of a plurality of releasably connectible curved segments 171, 172, 173 and 174. Preferably, these curved segments are made to interconnect by the interengagements of protrusions 18 and recesses 19 as better seen in FIG. 2. One end curved segment 171 is provided with a hole 20 for receiving one of the pin members 16 and another end curved segment 174 is provided with a hole 21 for receiving another pin member 16. To the end curved segment 174 is secured a casing 22, such as, by screwing, which houses a driving mechanism 23 which can be any known device electrically or mechanically operable to rotate the pin member 16. Preferably, the drive mechanism 23 adapted in the embodiment is a mechanical musical apparatus which includes a main spring (not shown) operated by a rotary knob 24 to rotate, through an output shaft 25, a metal reed 26 which can produce a musical sound when engaged with a metal comb 27. The output shaft 25 is parallel with the pin member 16 and is further provided with a gear member 28 which engages a further gear member 29 affixed to the pin member 16, as better seen in FIG. 3. Therefore, when a torque is applied to the main spring through the rotary knob 24, the reversing torque will operate the metal reed 26 as well as the pin member 16 through the output shaft 25.

It can be appreciated from FIG. 3 that there is provided a fixed annular member 30 sleeved onto the pin member 16 and a retaining pin 31 projected from the annular member 30. When the gear members 28 and 29 are interengaged the gear member 29 is engaged with the retaining pin 31 so that the rotary motion can be transmitted to the pin member 16 as well as the globe 11. However, the gear member 29 can be disengaged from the gear 28 by sliding it upward along the pin 16 and turning it to an angle to release from the engagement with the pin 31. At this position, the globe is separated from the driving mechanism 23 and thereby can be rotated by hand.

As embodied herein, the stand 12 is constructed in the form of a hollow body. On the top of the stand 12 is a socket (not shown) which can received a projecting portion 32 of the curved segment 174, thereby enabling the bowed support arm 17 to rest on the stand 12. It can be appreciated that the angle of the axis of the globe 11 can be varied by providing a projecting portion similar to the projecting portion 32 on any chosen curved segment, 171, 172, 173 or 174, for inserting into the socket of the stand 12. The assembly according to the invention has also an advantage that the globe assembly 10 after being disassembled can be stowed in the hollow stand 12. When the globe assembly is set up, the stand 12 can be used as a saving box.

With the invention thus explained, it is apparent that obvious modifications and variations can be made without departing from the scope of the invention. It is therefore intended that the invention be limited only as indicated in the appended claims.

I claim:

1. A globe assembly comprising:
a hollow sphere of flexible material having two inflating passages on the wall thereof at diametrically opposite positions; two plug members for obstructing said passages, said plug members each including a pin member; a bowed support arm having end portions with pin holes for receiving said pin members for rotation therein; a stand for supporting said bowed support arm; a driving mechanism provided at a lower end portion of said bowed arm and having an output shaft; and a pair of gears mounted respectively to said output shaft and said pin member at the lower end of said bowed arm, said gears being engageable and disengageable from each other; whereby the sphere can be rotated either by hand or by the driving mechanism.

2. A globe assembly as claimed in claim 1, wherein said driving mechanism has a musical unit which produces a sound simultaneously with the rotation of the sphere.

3. A globe assembly comprising:
a globe-shaped envelope of flexible material having two inflating passages on the wall thereof in diametrically opposite positions; two plug members for obstructing said passages; a bowed support arm formed of releasably connectable curved segments; two pin members fixedly received in said plug members and passing through two end portions of said bowed support arm; a driving mechanism mounted to the lower end portion of said bowed arm and having an output shaft; a pair of gears respectively mounted on said output shaft and one of said pin members at the lower end portion of said bowed arm, said gears being engageable and disengageable from each other; and a stand for supporting said bowed arm; whereby the globe can be rotated either by hand or the driving mechanism.

4. A globe assembly as claimed in claim 3, wherein said driving mechanism has a musical unit which produces a sound simultaneously with the rotation of the globe.

* * * * *